United States Patent
Ferris et al.

(10) Patent No.: US 9,140,366 B2
(45) Date of Patent: Sep. 22, 2015

(54) BEARING ISOLATOR SEAL FOR ROTATING SHAFT

(71) Applicant: Flowserve Management Company, Irving, TX (US)

(72) Inventors: Jason Ferris, Plainwell, MI (US); Paul Bender, Bettendorf, IA (US); Jason Malocha, Scotts, MI (US); Joseph Barker, Delton, MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 14/592,453

(22) Filed: Jan. 8, 2015

(65) Prior Publication Data

US 2015/0198252 A1  Jul. 16, 2015

Related U.S. Application Data

(60) Provisional application No. 61/925,894, filed on Jan. 10, 2014.

(51) Int. Cl.
*H02K 5/124* (2006.01)
*F16J 15/34* (2006.01)

(52) U.S. Cl.
CPC .......... *F16J 15/3404* (2013.01); *F16J 15/3464* (2013.01)

(58) Field of Classification Search
CPC ......... F16J 15/44; F16J 15/443; F16J 15/447; F16J 15/4472; F16J 15/4474; F16J 15/4476; F16J 15/4478
See application file for complete search history.

(56) References Cited

U.S. PATENT DOCUMENTS

| | | | |
|---|---|---|---|
| 4,679,801 | A | 7/1987 | Poloni |
| 4,743,034 | A | 5/1988 | Kakabaker et al. |

(Continued)

FOREIGN PATENT DOCUMENTS

| | | |
|---|---|---|
| GB | 2041111 A | 9/1980 |
| JP | 6250378 | 3/1987 |

(Continued)

OTHER PUBLICATIONS

Stuttgart Paper, Liquid-Collecting Labyrinth Seals for Machine Tool Spindles, (Erhard Fritz, Werner Haas, Heinz K. Mueller), University Stuttgart, Germany, Copyright Kluwer Academic Publishers 1992.

(Continued)

*Primary Examiner* — Gilbert Lee
(74) *Attorney, Agent, or Firm* — Miller Canfield Paddock and Stone; Mark L Maki

(57) ABSTRACT

A bearing isolator seal includes a rotor and stator wherein the stator has inboard and outboard radial projections which define a groove bounded by groove side faces and a groove bottom face. The rotor extends radially and then axially so as to lie closely adjacent to the terminal end of the outboard radial projection on the stator to define an entrance passageway. The bearing isolator seal includes a surface geometry which is believed to result in improved exclusion of contaminants, particularly from high velocity water spray, wherein the entrance passageway is angled to increase the rotational effects of exclusion during shaft rotation, and wherein the groove side faces are also angled to assist in redirecting spray and other contaminants away from the passageway.

16 Claims, 3 Drawing Sheets

(56) References Cited

U.S. PATENT DOCUMENTS

| | | | |
|---|---|---|---|
| 5,498,006 A * | 3/1996 | Orlowski | 277/419 |
| 5,522,601 A | 6/1996 | Murphy | |
| 5,904,356 A | 5/1999 | Mundy | |
| 6,419,233 B2 | 7/2002 | Orlowski | |
| 6,843,623 B2 | 1/2005 | Geissler | |
| 7,052,014 B1 | 5/2006 | Orlowski | |
| 7,201,377 B2 | 4/2007 | Chitren | |
| 7,427,070 B2 | 9/2008 | Chitren et al. | |
| 7,604,239 B2 | 10/2009 | Chitren et al. | |
| 2001/0002742 A1 * | 6/2001 | Orlowski | 277/361 |
| 2007/0241513 A1 * | 10/2007 | Roddis | 277/412 |
| 2007/0246893 A1 * | 10/2007 | Roddis | 277/408 |
| 2007/0296157 A1 * | 12/2007 | Roddis | 277/411 |
| 2011/0204734 A1 * | 8/2011 | Orlowski et al. | 310/85 |
| 2012/0000308 A1 | 1/2012 | Schuetterle et al. | |
| 2013/0223781 A1 | 8/2013 | Ketchel et al. | |

FOREIGN PATENT DOCUMENTS

| | | |
|---|---|---|
| JP | 2-116068 | 9/1990 |
| JP | 3-120301 | 12/1991 |
| JP | 11108202 | 4/1999 |
| JP | 2013/142414 A | 7/2013 |
| WO | WO 2013/100099 A1 | 7/2013 |

OTHER PUBLICATIONS

The International Search Report and Written Opinion of the International Searching Authority for PCT/US2015/010605, date completed Mar. 24, 2015, date mailed Apr. 8, 2015.

* cited by examiner

BEARING ISOLATOR SEAL FOR ROTATING SHAFT

CROSS REFERENCE TO RELATED APPLICATIONS

This application asserts priority from provisional application 61/925,894, filed on Jan. 10, 2014, which is incorporated herein by reference.

FIELD OF THE INVENTION

The invention relates to a bearing isolator seal for use on rotating shafts of equipment to protect shaft bearings from exposure to contaminants such as liquids which may be sprayed thereon.

BACKGROUND OF THE INVENTION

There are various types of rotating equipment such as pumps and compressors which include a rotating shaft that is driven by a conventional motor. The equipment includes an equipment housing which surrounds the shaft and a passage which defines a bearing cavity or chamber through which the shaft extends. To rotatably support the shaft within the bearing cavity of the equipment housing, one or more conventional bearings are provided in the bearing cavity which bearings extend radially between an inward facing passage surface in the equipment housing and an outer shaft surface on the shaft and provide radial support to the shaft. This is a conventional arrangement.

The shaft itself may either be exiting the equipment housing or may be entering another equipment housing wherein the shaft is exposed to the outside environment as it enters or exits the housing.

Therefore, the housing has an opening which opens towards this exterior environment and has the passage surface which is spaced radially outwardly of the shaft surface. The bearing is located within the bearing cavity or chamber defined between such opposing surfaces. Typically, the bearing is spaced a desired axial distance from the outside end face of the housing. In the absence of any other sealing structure, atmospheric contamination such as dust, water, moisture, etc. can enter into the bearing cavity and enter into the bearings which can cause damage or decrease performance of the bearings.

To protect the bearings, mechanical devices known as bearing isolators or other equivalent terms have been developed which fit into the housing opening and span the distance between the housing surface and shaft surface. These bearing isolators include a rotor affixed to the shaft and a stator which is affixed to the equipment housing wherein the bearing isolator has closely spaced surfaces that define very narrow passages which prevent or impede the entry of any of such liquid, dust or other contaminates into the bearing space.

Generally, bearing isolators, also known as labyrinth seals are applied to a variety of rotating equipment having oil lubricated, greased, oil mist and unlubricated bearings wherein these bearing isolators serve to retain the lubricant in the bearings and/or prevent external contaminants from entering the bearing cavity. The opposed surfaces between the rotor and stator define a tortuous path to restrict the passage of fluids through the bearing isolator components. In some cases, a secondary static seal may also be provided in the bearing isolator to further restrict fluid when the seal is not in operation such as when the shaft is not rotating.

Conventional bearing isolators use a variety of shapes and features on the atmospheric side of the bearing isolator seal to prevent external contaminants from entering the bearing isolator. The most challenging contaminant to exclude is a high velocity water spray, which may come from an equipment wash down hose, pressure washer or in extreme weather events with high winds and rains. Various bearing isolator seal designs have been developed and these designs typically are developed to resist such contaminating conditions.

The object of the present invention is to provide an improved geometric configuration for the atmospheric side of a bearing isolator seal that provides more effective resistance to the ingress of contaminants, particularly, high velocity water spray.

In the improved arrangement of the present invention, a rotor and stator have projections which extend radially and axially. As to the stator, the stator mounts within the equipment housing and has a first radial projection against the housing to define an inboard set of geometric surfaces. The stator then extends axially and includes an outboard radial projection which is spaced axially from the inboard radial projection and extends radially, outwardly to a smaller extent than the inboard radial projection. These axially-spaced radial projections thereby define an annular groove bounded by groove side faces and a groove bottom face.

The rotor includes a radial projection which extends outwardly close to the outboard radial projection on the stator, and the rotor then includes an axial projection which turns in the inboard direction, towards the housing so as to lie closely adjacent to the terminal end of the radial projection on the stator. The radial outward facing surface on the stator radial projection and the opposing inward facing surface on the rotor axial projection define an entrance passageway which is necessary due to the relative rotation between the stator and rotor and these opposed surfaces thereof. The basic combination of a rotor and stator with these types of projections located close to each other is well known in the prior art.

The improved bearing isolator seal of the present invention includes an improved geometry which is believed to result in improved exclusion of contaminants in high velocity water spray from the bearing cavity of the rotating equipment. The bearing isolator seal employs several features as follows:

1) An annular groove on the stator which is defined between the inboard radial projection and the outboard radial projection wherein the stator groove has angled side surfaces on the inboard and outboard sides and no right angles wherein these angled side surfaces redirect incoming contaminants and high velocity spray and reduce the possibility of the incoming contaminant flow entering the restricted flow path defined by the entrance passageway referenced above.

2) An angled interface between the stator and rotor surfaces which define the entrance passageway and thereby increases the rotational effects of exclusion during shaft rotation. This angled feature of the entrance passageway also assists in the draining of contaminants from the bottom of the bearing isolator seal, even in a static condition while the shaft is not rotating.

3) The stator features the inboard radial projection which is larger than the outboard stator radial projection and any diameter on the rotor which further assists in redirecting spray and other contaminants.

Referencing the entrance passageway, the entrance passageway and the opposing surfaces between the rotor and stator are formed at an angle relative to the rotational axis of the equipment shaft. As such, the entrance passageway is at an angle of 5-45 degrees and preferably 15 degrees relative to the shaft axis. This passage angle enhances the centrifugal effects to eject any contaminants from the entrance of the passageway and also assist with draining at the bottom or 6 o'clock position of the seal when the equipment is not rotating. The entrance passageway communicates with the annular groove formed between the inboard and outboard radial projections on the stator.

The groove has the groove side faces which define the inboard and outboard faces thereof. The groove side faces each have an angular orientation or design wherein such groove surfaces are oriented at obtuse angles relative to the bottom groove surface. Each of the groove side faces is oriented at an angle of 95 to 135 degrees relative to the bottom groove surface and preferably is oriented at 105 degrees. Preferably, each groove side face is at the same angle in comparison to the other groove side face. These obtuse angles help to redirect an incoming high velocity spray out of the groove to minimize the amount of spray which can enter the entrance passageway. It is believed that traditional right angles reflect the same high velocity spray closer to the direction in which it comes and is more likely to enter the entrance passageway.

This arrangement is believed to provide improvements over other known bearing isolator seals.

Other objects and purposes of the invention, and variations thereof, will be apparent upon reading the following specification and inspecting the accompanying drawings.

Figure 1:
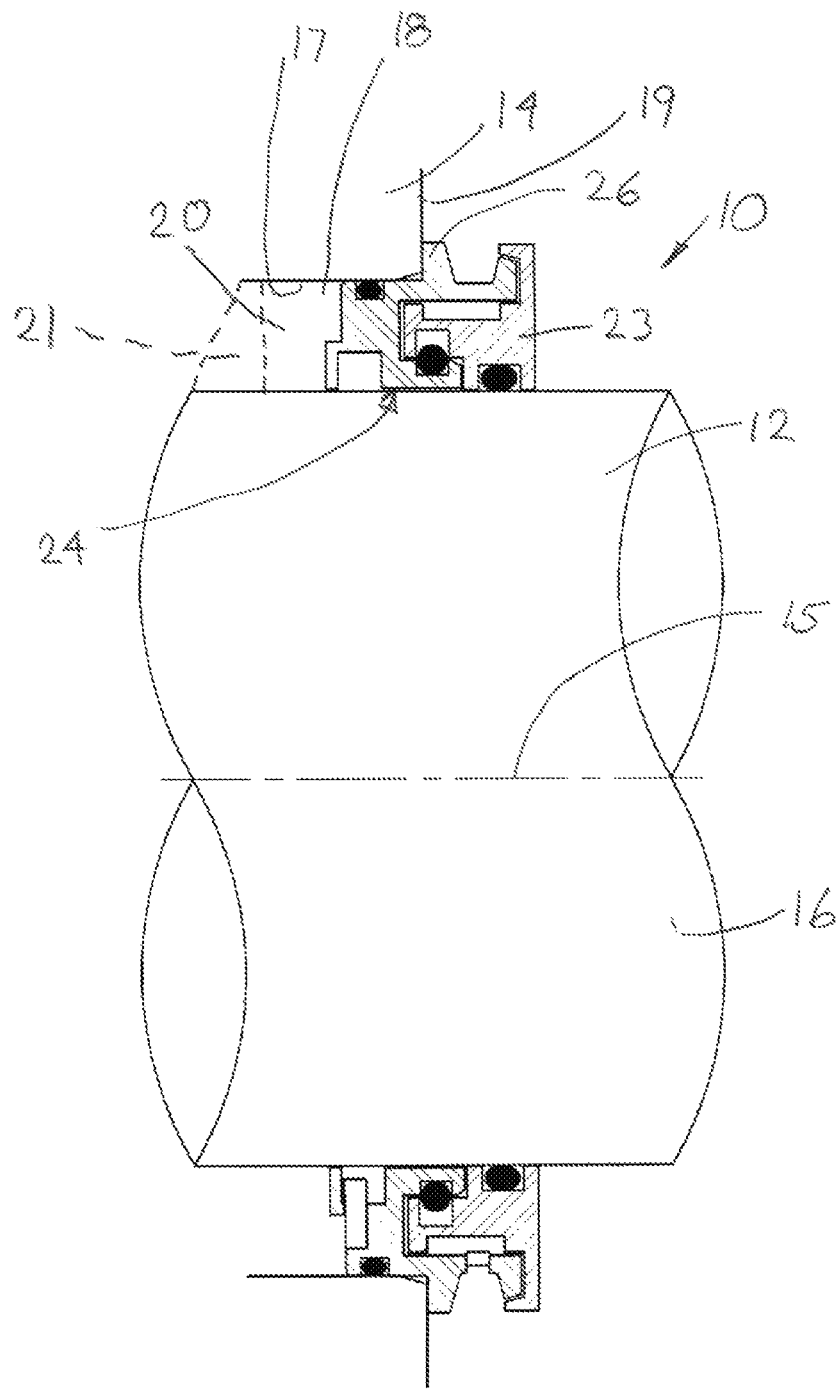
FIG. 1 is a side cross-sectional view of a bearing isolator seal disposed between a shaft and equipment housing.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a bearing isolator seal 10 of the present invention is shown mounted to an equipment shaft 12 and an equipment housing 14.

The shaft 12 rotates about a shaft axis 15 and has an annular, outer shaft surface 16 which faces radially outwardly. The equipment housing 14 has an inward facing passage surface 17 disposed in opposing, radially spaced relation from the shaft surface 16, wherein the passage surface 17 defines a passage 18 through which the shaft 12 extends axially. The passage 18 opens axially from a housing end face 19, and essentially defines a bearing cavity or chamber 20 in which a bearing unit 21 is installed. The bearing unit 21 may be any type of bearing suitable to rotatably support the shaft 12 with examples being listed above.

Generally, the bearing isolator assembly 10 includes a shaft-mounted rotor 23 and housing-mounted stator 24 which are relatively rotatable relative to each other. As to the stator 24, the stator 24 stationarily mounts within the open end of the passage 18 on the equipment housing 14 and has a first, inboard radial projection 26 which abuts against the housing end face 19. The rotor 23 in turn mounts to the shaft 12 and rotates therewith. The rotor 23 and stator 24 have closely spaced surfaces which prevent or limit the egress of various types of contaminants, like high velocity water spray, to protect the bearing 21.

Figure 2:
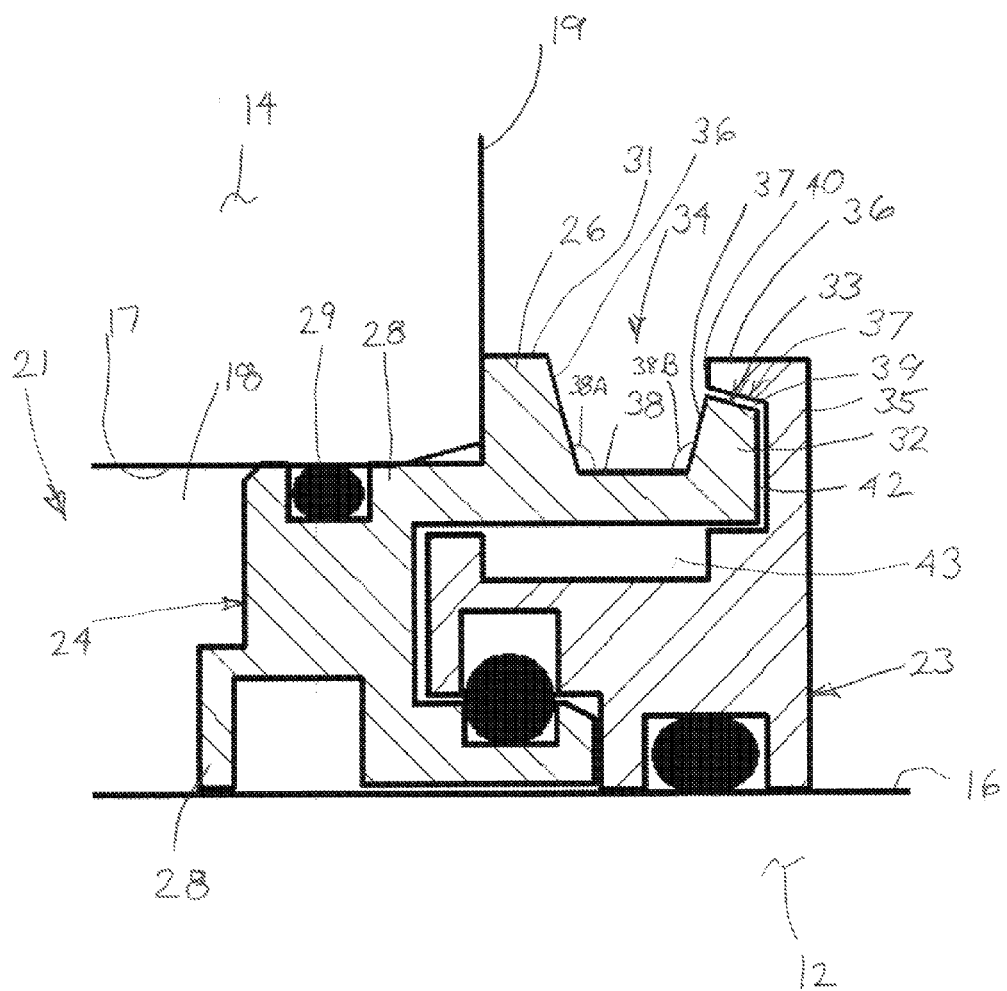
FIG. 2 is an enlarged view of the bearing isolator seal at a top or 12 o'clock position.
Figure 3:
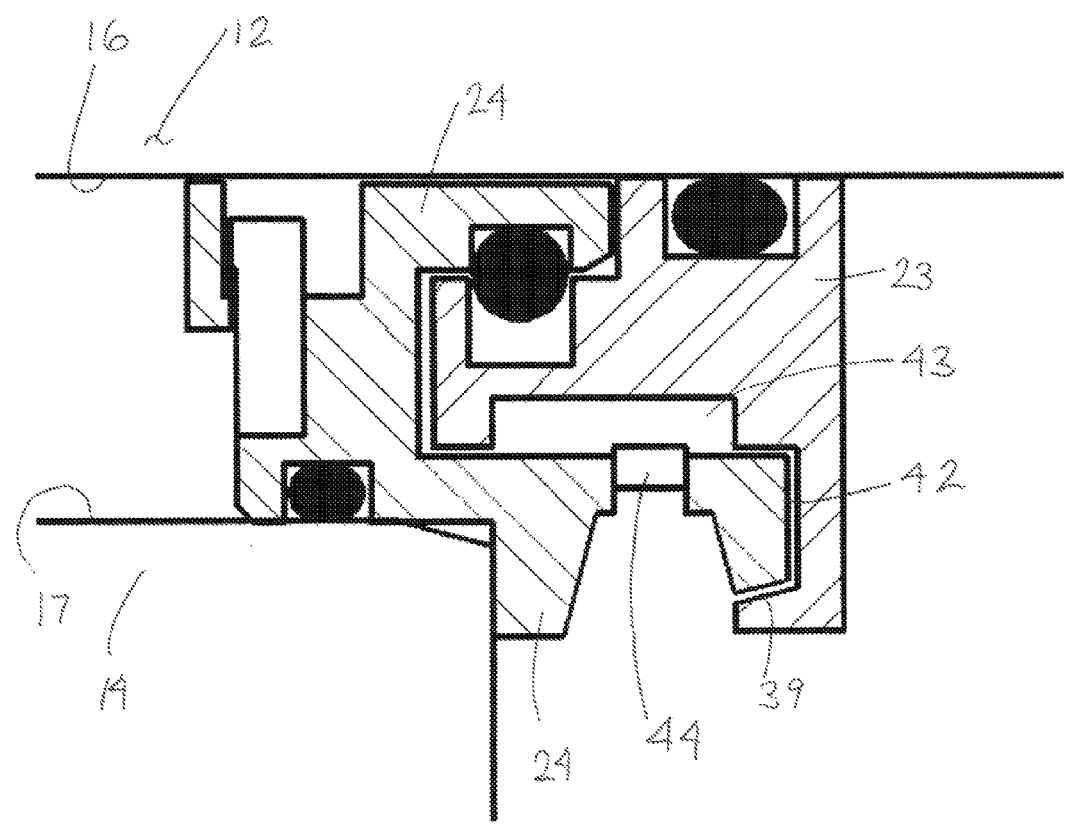
FIG. 3 is a cross-section of the bearing isolator seal at the bottom or 6 o'clock position.

The rotor 23 and stator 24 are formed as annular rings which surround the shaft 12 with FIGS. 2 and 3 showing the cross-sectional shape at the top, 12 o'clock position, and the bottom, 6 o'clock position on these annular rings.

Referring to FIG. 2, the stator 24 has an inboard portion 28 that fits within the passage 18 and is sealed there against by an O-ring 29. The inboard radial flange 26 projects radially to define an outer flange surface 31 at the outside diameter (OD). The radial flange 26 abuts against the housing end face 19.

The stator 24 then extends axially and includes an outboard radial projection 32 which is spaced axially from the inboard radial projection 26 and extends radially, outwardly to a smaller extent than the inboard radial projection 26 so as to define a terminal outer surface 33. These axially-spaced radial projections 26 and 32 thereby define an annular groove 34, which opens radially outwardly and is bounded by inboard and outboard groove side faces 36 and 37 and a groove bottom face 38.

The groove bottom face 38 is generally parallel to the shaft axis 15 (FIG. 1), while the groove side faces 36 and 37 are oriented at non-perpendicular, obtuse angles 38A and 38B relative to the shaft axis 15 and the groove bottom face 38. Each of the groove side faces 36 and 37 is oriented such that the obtuse angles 38A and 38B are at an angle of 95 to 135 degrees relative to the bottom groove surface 38 and the shaft axis 15 and preferably is oriented at 105 degrees. Preferably, each groove side face 36 and 37 is at the same angle in comparison to the other groove side face. While the respective obtuse angles of the groove side faces 36 and 37 are preferably the same and essentially mirror images of each other, the groove side faces 36 and 37 also may be oriented at different obtuse angles relative to each other.

Also, the outer terminal face 33 of the outboard radial projection 32 is angled relative to the shaft axis 15 as will be discussed in more detail herein.

The rotor 23 includes a radial projection 35 which extends outwardly close to the outboard radial projection 32 on the stator 24, and the rotor 23 then includes an axial projection 36 which turns in the inboard direction, towards the housing 14 so as to lie closely adjacent to the terminal surface 33 of the stator radial projection 32. The radially outward facing surface 33 on the stator radial projection 32 and an opposing inward facing surface 37 on the rotor axial projection 36 define an entrance passageway 39 which are slightly separated to allow relative rotation between the stator 24 and rotor 23 but sufficiently close to substantially restrict entry of contaminants between the opposed, relatively-moving surfaces 33 and 37.

The rotor axial projection 36 also has an end face 40 which is generally perpendicular to the shaft axis 15 but is skewed or oriented at an angle relative to the adjacent groove side face 37. These skewed faces 37 and 40 help redirect fluid flow past the passageway 39 and out of the groove 34.

Referencing the entrance passageway 39, the entrance passageway 39 and the opposing surfaces 33 and 37 are formed at an angle relative to the shaft axis 15. As such, the entrance passageway 39 is at an angle of 5-45 degrees and preferably at an acute angle of 15 degrees relative to the shaft axis 15. This passage angle enhances the centrifugal effects caused by the relative movement of the surface 37 relative to surface 33 during shaft rotation to eject any contaminants from the entrance of the passageway 39 and also assist with draining at the bottom or 6 o'clock position (FIG. 3) of the rotor 23 and stator 24 when the shaft 12 is not rotating.

The entrance passageway 39 also communicates with an interface passage 42 which extends radially inwardly and is formed between opposed, closely-adjacent surfaces of the rotor 23 and stator 24. This passage 42 in turn opens into a collection groove 43 that collects any contaminants that make it into the entrance passageway 39. The collection groove 43 surrounds the rotor 23 and at the bottom, 6 o'clock position shown in FIG. 3, the groove 43 empties into an outlet port 44 formed in the stator 24.

In view of the foregoing, the improved bearing isolator seal 10 includes an improved geometry which is believed to result in improved exclusion of contaminants, particularly in high velocity water spray from the bearing cavity 21 of the rotating equipment. This design exhibits a combination of features which combine to provide improved performance.

For example, the annular stator groove 34 has the angled side surfaces 36 and 37 on the inboard and outboard sides and no right angles. As such, these angled side surfaces 36 and 37 redirect incoming contaminants and high velocity spray and reduce the possibility of the incoming contaminant flow entering the restricted flow path defined by the entrance passageway 39. These obtuse angles help to redirect the incoming high velocity spray radially outwardly out of the groove 34 to minimize the amount of spray and other contaminants which can enter the passageway 39 between the rotor 23 and stator 24.

It is preferred that both surfaces 36 and 37 are angled, whether at the same or different obtuse angles to eliminate right corners within the groove 34. This is believed to enhance the deflection and flow of spray out of the groove 34 and reduce the tendency for such spray to enter the passageway 39.

Further, the inboard radial projection 26 defines an additional deflection surface 31 within the spray zone next to the groove 34. Preferably, the outer diameter of the radial projection 26 is greater than the diameter of the outboard radial projection 32 but is closely proximate to or greater than the outer diameter defined by the rotor axial projection 36. If the diameter of the surface 31 is too large or too small, the fluid spray will merely deflect downwardly into the groove 34, rather than having the partial deflection of spray outwardly which is affected by the deflection surface 31. As such, the deflection surface 31 provides an additional surface that can help to redirect some of the spray outwardly and away from the entrance passageway 39.

Also, the angled interface between the stator and rotor surfaces 33 and 37 which define the entrance passageway 39 thereby increases the rotational effects of exclusion during shaft rotation. This angled feature of the entrance passageway 39 also assists in the draining of contaminants from the bottom of the bearing isolator seal, even in a static condition while the shaft 12 is not rotating.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A bearing isolator seal for sealing a bearing cavity between an equipment housing and a rotatable shaft, said bearing isolator seal comprising:
    a housing-mountable stator having a mounting portion engagable with an equipment housing, an inboard radial flange located for axial abutment against an exterior end face of an equipment housing, and an outboard radial flange spaced axially from said inboard radial flange, said inboard and outboard radial flanges being axially spaced apart so as to define respective first and second groove side faces and a groove bottom face extending axially therebetween to define an annular, groove opening radially outwardly, each of said first and second groove side faces being inclined at respective obtuse angles relative to said bottom groove face;
    a shaft-mountable, rotatable rotor wherein said rotor and stator have closely spaced, opposing passageway surfaces which define an entrance passageway between an outer stator face of said second radial flange and an opposing inner rotor face on said rotor, said entrance passageway extending at an angle relative to a shaft axis to which said bearing isolator seal is mountable, said entrance passageway opening toward said inboard radial flange of said stator at a passage angle, wherein said obtuse angles of said first and second groove side faces deflecting fluid away from said entrance passageway and said passage angle of said entrance passageway increases centrifugal exclusion of fluids during rotation of said rotor.

2. The bearing isolator seal according to claim 1, wherein said groove bottom face is generally parallel to a shaft axis while said groove side faces have are oriented at said obtuse angles non-perpendicular said shaft axis.

3. The bearing isolator seal according to claim 1, wherein each of said groove side faces are oriented such that said obtuse angles are at an angle of 95 to 135 degrees relative to said bottom groove surface.

4. The bearing isolator seal according to claim 3, wherein at least one of said obtuse angles is oriented at 105 degrees relative to said bottom groove surface.

5. The bearing isolator seal according to claim 1, wherein said outboard radial projection is spaced axially from said inboard radial projection and extends radially, outwardly so as to terminate at an outer stator surface which defines one said passage surface.

6. The bearing isolator seal according to claim 5, wherein said rotor includes a rotor axial projection which extends in an inboard direction toward said first radial flange so as to lie closely adjacent to said outer stator surface of said second radial projection of said stator and define said entrance passageway therebetween.

7. The bearing isolator seal according to claim 6, wherein said rotor axial projection comprises an inner rotor surface which defines the other of said passage surfaces wherein said outer stator surface and said inner rotor surface define said entrance passageway, said outer stator surface and said inner rotor surface being closely adjacent but separated to allow relative rotation between said stator and said rotor while restricting entrance of fluids therein.

8. The bearing isolator seal according to claim 7, wherein said rotor axial projection has a rotor end face which is perpendicular to said shaft axis but is skewed relative to an adjacent one of said groove side faces to facilitate redirection of fluid flow past said entrance passageway.

9. The bearing isolator seal according to claim 7, wherein said entrance passageway extends at a passage angle of 5-45 degrees relative to a shaft axis.

10. The bearing isolator seal according to claim 9, wherein said passage angle of said entrance passageway is at an acute angle of about 15 degrees relative to said shaft axis.

11. The bearing isolator seal according to claim 7, wherein said entrance passageway extends at said passage angle enhances centrifugal effects caused by the relative movement of the passage surfaces during rotation of said rotor to eject contaminants from said entrance passageway and also assist with draining of contaminants at a bottom 6 o'clock position of said rotor and stator.

12. The bearing isolator seal according to claim 11, wherein said stator includes a drain port at said bottom 6 o'clock position which is in fluid communication with said entrance passageway.

13. The bearing isolator seal according to claim 1, wherein said entrance passageway extends at a passage angle of 45 degrees or less which enhances centrifugal effects caused by the relative movement of the passage surfaces during rotation of said rotor to eject contaminants from said entrance passageway and also assists with draining of contaminants at a bottom 6 o'clock position of said rotor and stator.

14. The bearing isolator seal according to claim 13, wherein said stator includes a drain port at said bottom 6 o'clock position which is in fluid communication with said entrance passageway.

15. The bearing isolator seal according to claim 1, wherein said rotor includes a rotor axial projection which extends in an inboard direction toward said first radial flange so as to lie closely adjacent to said outer stator surface of said second radial projection of said stator and define said entrance passageway therebetween, said inboard radial projection defines an additional deflection surface at an outer diameter similar to an outer diameter of said rotor axial projection.

16. The bearing isolator seal according to claim 1, wherein said outer diameter of said inboard radial projection is greater than an outer diameter of the outboard radial projection but is closely proximate to or greater than said outer diameter defined by said rotor axial projection.

\* \* \* \* \*